July 16, 1935.  C. S. JOHNSON  2,008,305
WEIGHING BATCHER
Filed March 6, 1933   2 Sheets-Sheet 1
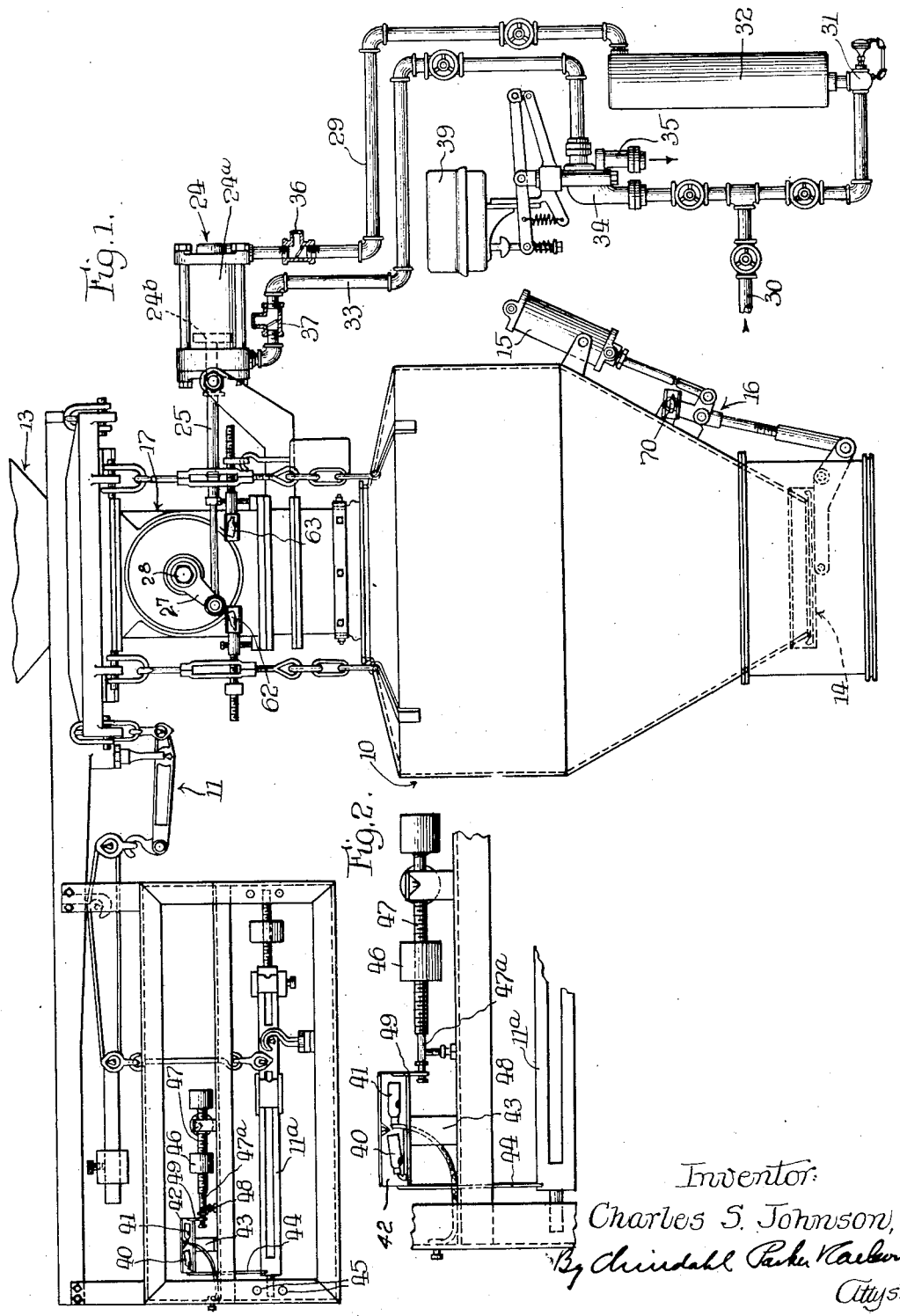
Inventor:
Charles S. Johnson,
By Chindahl Parker Carlson
Attys.

July 16, 1935.   C. S. JOHNSON   2,008,305
WEIGHING BATCHER
Filed March 6, 1933   2 Sheets-Sheet 2
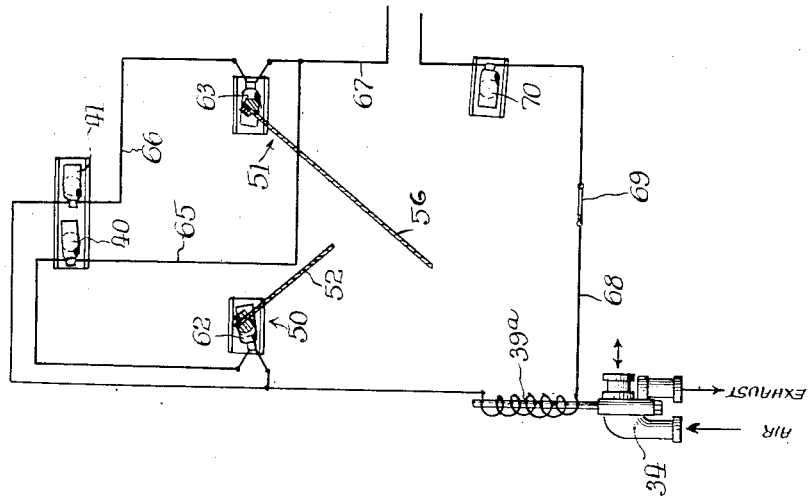
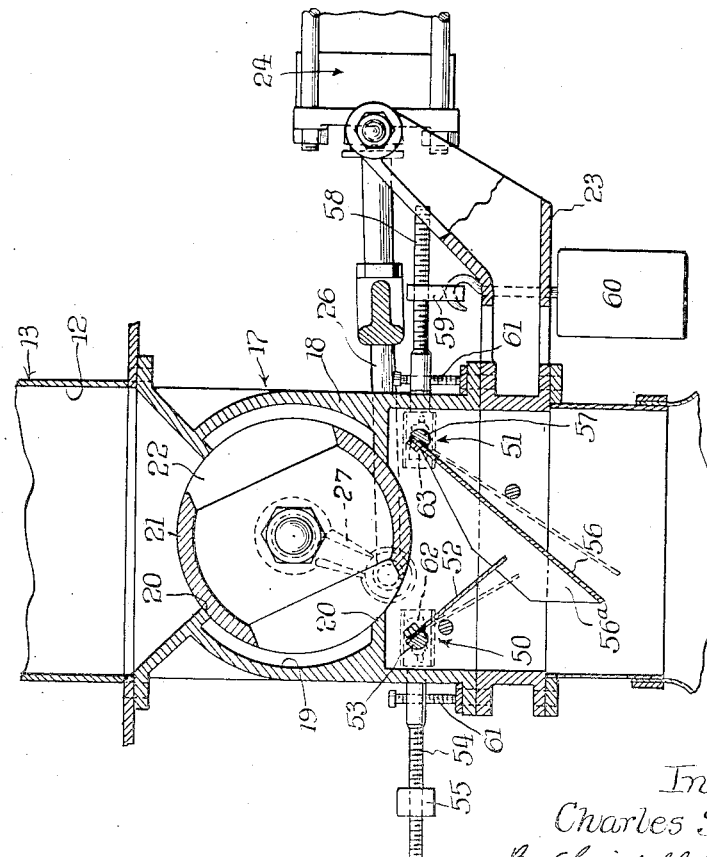
Inventor
Charles S. Johnson,
By Chindahl Parker & Carlson
Attys Patented July 16, 1935

2,008,305

UNITED STATES PATENT OFFICE 2,008,305

WEIGHING BATCHER

Charles S. Johnson, Champaign, Ill.

Application March 6, 1933, Serial No. 659,760

34 Claims. (Cl. 249—37)

The invention relates generally to weighing devices and more particularly to such devices adapted for automatically weighing free flowing material such as concrete aggregates or cement into batches of predetermined weight.

In practice bulk material such as concrete aggregate or cement varies greatly in its flow characteristics, due in a large measure to the effect of aeration, packing, or arching of the material in the supply bin. If arching of the material occurs, the arch may be broken by further opening of the valve that controls the flow, and breaking may occur with different degrees of opening. When an arch breaks, a sudden flow of large volume tends to occur. Hence the rate of flow of the material from the supply bin to the weigher may vary through a wide range in successive weighing operations, and in most instances, during a single weighing operation. For example, a supply bin may contain cement which in one portion contains arched cement which resists flow, while in another portion the cement may be aerated so as to possess substantially the flow characteristics of water.

With the above situation in mind, an important object of the invention is to provide an automatic weighing batcher which is sensitive to such variations in the flow characteristics of the material so as to insure accurate weighing of the batches.

Another object is to provide a weighing batcher wherein the rate of flow of the material exercises a controlling influence upon the cut-off valve of the supply bin.

Another object is to provide such a batcher wherein the cut-off valve of the supply bin is controlled through means sensitive to the rate of flow of the material as well as to the weight of the material in the weighing hopper.

Another object of the invention is to provide a weighing batcher having cut-off means between the bin and the weighing hopper governed by a pair of control devices sensitive to different rates of flow of the material, together with scale-actuated means operable to render said devices successively effective to permit relatively rapid filling of the hopper except during the final portion of the filling operation, during which portion the rate of flow is materially reduced so as to prevent over-running of the desired weight.

Another object is to provide a weighing batcher in which the final portion of the filling operation is controlled by means sensitive to the rate of flow, which means is positioned closely adjacent the cut-off valve so that the quantity of flowing material which has passed the valve is reduced to a minimum at the time said means is affected by the flow.

Another object of the invention is to provide a novel weighing batcher wherein the feeding of material to the weighing hopper is automatically initiated by conditioning the hopper for the reception of material, as by closing of the discharge valve after dumping of the hopper.

Another object is to provide a batcher embodying a new and improved cut-off valve mechanism and actuator therefor.

Other objects and advantages will become apparent from the following description taken in connection with the accompanying drawings in which:

Figure 1 is a front elevational view of a weighing batcher embodying the features of the invention.

Fig. 2 is an enlarged elevational view of a portion of the switch mechanism.

Fig. 3 is a vertical sectional view of the cut-off valve.

Fig. 4 is a wiring diagram showing the various control circuits.

For purposes of disclosure the preferred form of the invention has been illustrated in the drawings and will hereinafter be described in detail, but it is to be understood that this disclosure is not intended as a limitation of the invention to the type of apparatus shown, it being contemplated that various changes might be made by those skilled in the art to adapt the invention to other types of apparatus without departing from the spirit and scope of the invention as defined by the appended claims.

In the form chosen for disclosure herein the invention is embodied in a weighing batcher comprising a hopper 10 carried by the lever system of a beam scale 11 so as to be supported beneath the discharge opening 12 of a supply bin 13. The hopper 10 is of the downwardly converging bottom discharge type having a bottom discharge valve 14. A pressure fluid actuated piston and cylinder device 15 mounted on the hopper 10 acts through a toggle mechanism 16 to operate the valve 14, the piston and cylinder device being controlled by any desired means of a conventional character.

Between the supply bin 13 and the hopper 10 a cut-off valve 17 is positioned to control the flow of material from the bin to the hopper. The valve 17 is preferably of the rotatable plug type having a valve casing 18 (Fig. 3) providing a horizontally positioned cylindrical valve chamber 19 with vertically alined openings 20 in the top and bottom thereof to provide for the passage of the material through the chamber 19 under the control of a valve member 21 rotatably mounted in the chamber. The valve member 21 is of generally cylindrical form and is rotatable upon a horizontal axis to bring its transverse opening 22 into and out of registry with the openings 20 in the valve casing. When the valve member is partially open it will be noted that the upper and lower openings provided thereby are offset to prevent a direct flow from the supply bin to the scale hopper.

In a hand-operated bin, a skilled operator is aware of the characteristics and tendencies of the materials handled. Thus, in the case of sand or cement, the operator knows that the material tends to arch over the opening from the bin and that such an arch must be broken by further opening of the cut-off valve. But, he is also well aware of the fact that a sudden rush of material occurs with the breaking of the arch, hence when an arch breaks when the scale hopper is nearly filled, he instantly closes or partly closes the valve, in order to prevent an over-weight of material entering therein. Such control is accurate and becomes "second nature" to a skilled operator.

The present apparatus simulates such hand control and automatically attains the accuracies thereof. Thus in the present apparatus, the cut-off valve 21 opens slowly to the extent necessary to break any arch in the material. With the sudden rush of material incident to such breaking of an arch, the cut-off valve is instantly closed. During the final portion of the filling operation, the control is rendered finely sensitive to the flow immediately below the valve for the double purpose of preventing the weighing means from being affected by the impact of a large body of falling material and also to reduce to a minimum the amount of material which has passed the valve but has not yet fallen to the level of the flow-sensitive means.

On a stationary bracket 23 fixed to the valve casing 18, a pressure fluid actuated piston and cylinder device 24 is mounted, the cylinder 24$^a$ thereof being pivoted to the bracket 23 while the piston 24$^b$ is connected through a piston rod 25 having a bail shaped end 26 pivoted to actuating arms 27 (only one shown) of the valve member 21. The arms 27 are secured on the projecting end of stub shafts 28 which are fixed to the valve member. Thus the actuating device 24 serves to open and close the cut-off valve 17.

The valve 17 is preferably opened slowly and is closed rapidly, so that the moment a sudden rush of material occurs, as on the breaking of an arch, it may be stopped. To this end pressure fluid from a suitable source (not shown) is supplied constantly to the remote end of the cylinder 24$^a$ through a pipe 29 so as to tend to close the valve 17. The fluid from the source is preferably under a relatively high pressure and is conducted by a supply pipe 30 to a reducing valve 31, and thence through an air receiver or tank 32 which is connected to the pipe 29. To the other end of the cylinder 24$^a$ a pipe 33 is connected, a three-way valve 34 being interposed in said pipe 33 between the cylinder 24 and the point at which the pipe 33 is connected to the high pressure supply pipe 30. The valve 34 provides at 35 for the exhaust of pressure fluid from the pipe 33 when the valve 34 is closed.

In order to cause slow opening movement of the cut-off valve 17, the pressure fluid supply pipes 29 and 33 have check or bleeder valves 36 and 37 therein, the check valve 37 in the pipe 33 being so disposed as to retard the flow of pressure fluid to the cylinder 24 but permit rapid exhaust, while the check valve 36 retards the flow of the exhaust through pipe 29 and permits rapid return of pressure fluid to the cylinder 24.

In accordance with the present invention the cut-off valve mechanism above described is governed through the cooperative controlling action of the weighing scale and means which is sensitive to the rate of flow of the material. If desired, the control may be arranged, as in the form herein illustrated, so as to provide for relatively rapid filling of the hopper during the major portion of the operation, followed by relatively slow feeding of the material until the desired weight is reached so that an excess of material in the scale hopper will be avoided.

To this end the scale 11, through movement of its beam 11$^a$, is arranged to govern the pressure fluid control valve 34, preferably by electrical means. Thus the valve 34 is equipped with an electromagnetic actuator 39 arranged to open the valve 34 when its magnet 39$^a$ is energized. In circuit with the magnet 39$^a$ are a pair of switches 40 and 41 adapted for actuation by the scale beam 11$^a$. The switches 40 and 41 are of the enclosed mercury type and are arranged to be opened successively in the upward movement of the scale beam 11$^a$. For this purpose the switches are mounted at different angles on a tiltable carrier 42 which in turn is pivoted at its midpoint on a frame member 43 above the scale beam.

A link 44 connecting the scale beam 11$^a$ with the carrier 42 serves to shift the carrier in accordance with the movement of the scale beam. The switch 40 is so mounted that it is opened when the beam 11$^a$ is centered between its stops 45, that is, when the desired weight of material has been fed to the hopper, and it is desirable that the switch 41 be opened when a slightly less weight has been reached. The point at which the switch 41 opens may be varied by means of an adjustable counter-weight 46 carried by a pivoted beam 47 mounted on the frame 43. One end 47$^a$ of the beam 47 is positioned beneath the carrier 42 and tends to move downwardly toward a stop 48, so as to act through a link 49 to pivot the carrier 42 so as to tend to raise the scale beam 11$^a$. The link 49 is so formed that it provides for lost motion between the link and the end 47$^a$ after the beam 47 has come to rest upon the adjustable abutment 48, whereby to permit free movement of the scale beam 11$^a$ and the associated switch carrier 42.

To act in conjunction with the weight-actuated switches 40 and 41 to control the cut-off valve 17, two devices 50 and 51 sensitive to the rate of flow of material are mounted in the valve casing 18 below the valve member 21. The flow-sensitive devices 50 and 51 are preferably similar in character, differing principally in size and in proximity to the cut-off valve 21. Thus the device 50 constitutes a minor material-flow detector positioned closely adjacent the valve 21 and comprises an impact plate 52 fixed at one edge to a rock shaft 53 journaled horizontally in the valve casing 18 beneath and along one edge of the lower opening 20 preferably on the side where the first opening occurs when the valve member is rotated from its closed position. An arm 54, having an adjustable counter-weight 55 thereon projects laterally from one end of the shaft 53 whereby to urge the impact plate 52 to a position wherein it projects transversely across the valve casing 18 in a downward direction and into path of the material moving through the casing at the point where the material passes from the valve 21.

The flow-sensitive device 51 is constructed to provide a major flow detector and comprises a slightly larger impact plate 56 carried by a rock shaft 57 similarly journaled in the casing 18 at the opposite side of the lower opening 20. On an arm 58 projecting laterally from the shaft 57 a nut 59 is adjustably threaded to carry a detachable, relatively heavy counter-weight 60. Similar transverse bolts 61 are provided on the two arms 54 and 58 to engage the valve casing 18 so as to limit movement of the impact plates by their respective counter-weights to the normal angular positions shown in full lines in Fig. 3. When in its normal angular position, the impact plate 56 directs the flow of material toward the minor flow detecting plate 52. This action is preferably facilitated by side flanges 56ª (only one shown) on the edges of the plate 56.

The controlling action of the flow-sensitive devices 50 and 51 upon the cut-off valve 17 is effected through electrical interconnection with the solenoid-operated air valve 34. For this purpose the rock shafts 53 and 57 carry enclosed mercury type switches 62 and 63, respectively, mounted on the ends of the shafts as shown in Fig. 1 so as to be closed when the impact plates extend across the valve casing. Thus the switches 62 and 63 are opened when the rate of flow of the material causes sufficient force to be exerted on the impact plates to swing them to the retracted positions shown in dotted outline in Fig. 3.

As will be evident in Fig. 4, two parallel conductors 65 and 66 connect one side 67 of an electrical source with the electromagnet 39ª, while the other side of the electrical source is connected to the magnet by a conductor 68. In the conductor 65, the two switches 40 and 62 are interposed in series, while the switches 41 and 63 are similarly interposed in the parallel conductor 66. In the conductor 68, a manual switch 69 is provided for disabling the device, together with a mercury switch 70. The switch 70 is mounted on an element of the toggle device 16 so as to be open when the hopper valve 14 is open.

When the hopper valve 14 is closed and the hopper 10 is empty, the circuit to the electromagnet 39ª is closed by both of the parallel conductors 65 and 66, thus causing the air valve 34 to be opened to initiate slow opening movement of the cut-off valve 17. The resulting flow of material strikes the flow-sensitive devices 50 and 51, and since the device 50 has a relatively light counter-weight, the impact plate 52 thereof is shifted so as to open its switch 62. The electromagnet 39ª, however, remains energized and the gradual opening movement of the valve 17 continues until the flow of material is sufficient to actuate the heavily counter-weighted impact plate 57 so as to open the second switch 63. When this occurs, both of the circuits 65 and 66 are broken and the magnet 39ª is deenergized so that the cut-off valve 17 closes instantly.

As a result of the closing of the cut-off valve 17, the flow-sensitive devices 50 and 51 return to their normal positions so as to close their switches 62 and 63 and initiate another opening movement of the valve 17. When the weight of the material in the hopper 10 is sufficient to raise the scale beam 11ª, the carrier 42 is rocked so as to open the switch 41. Hence the circuit 66 to the switch 63 of the major flow-control device 51 is broken and subsequent operation of the mechanism is controlled by the minor flow control device 50. It follows therefore that closing movement of the cut-off valve 17 is then affected by the flow at a point closely adjacent to the valve and is caused by a relatively small flow of material, the impact of which does not materially affect the accuracy of the scales, so that the final weight is approached gradually without an error due to impact until movement of the carrier 42 by the scale beam 11ª causes opening of the second switch 40, thereby breaking both circuits to the magnet 39ª.

The batch may then be discharged from the hopper 10 by actuation of the toggle 16, and in such opening the switch 70 is also opened so as to prevent closing of the various control circuits when the scale beam 11ª drops. Upon closure of the hopper 10, the switch 70 is again closed and the next filling operation is initiated as above described.

From the foregoing it will be evident that the present invention provides for feeding of the material to the hopper at different rates, and that this result is obtained through the use of a single valve. Due to the fact that the cut-off valve opens slowly under the control of the flow-sensitive device, the device is substantially unaffected by packing of the material above the cut-off valve. The mechanism, however, adapts itself to varying flow characteristics of the material and measures packed or loose material with equal facility.

In the prior art, the operation of the cut-off valve has been dependent upon the weight of the material in the scale-hopper, the stream of material between the valve and the hopper being added to the material in the hopper after the valve closes. In my apparatus, the valve is controlled by devices located close to the valve so as to reduce to a negligible minimum the length of the stream that is added to the hopper after the valve closes; and the cross-sectional size of the stream is reduced to the minimum by the use of the sensitive feeler 52.

I claim as my invention:

1. The combination of a scale, a hopper connected to the scale, a cut-off valve to control the flow of material to the hopper, two valve controlling feelers which are sensitive to the stream of material flowing from the valve to the hopper, one feeler being more sensitive than the other, and means controlled by the scale upon near approach to a predetermined weight for depriving the less-sensitive feeler of control of the valve.

2. The combination of a cut-off valve, a scale hopper arranged to receive material flowing through the valve, and two feelers of differing sensitivity located close to the valve and sensitive to the stream of material flowing from the valve to the hopper, for controlling the valve.

3. A device of the character described comprising a bin, a hopper adapted to be filled from said bin, an intermediate cut-off valve, weight-sensitive means operable to close said valve when a predetermined quantity of material has been fed into said hopper, and means automatically operable to close said valve when the rate of flow of material to said hopper exceeds a predetermined maximum.

4. A device of the character described comprising a hopper, a supply bin from which said hopper may be filled, a cut-off valve interposed therebetween, and means operable by a flow of material in excess of a predetermined maximum to effect complete closure of said valve and operable immediately thereafter to initiate opening of the valve said means including means displaceable against the force of gravity by a flow of material through the valve, such closure being more rapid than the opening.

5. A weighing batcher having a weighing scale, a hopper operatively connected to said scale, a supply bin from which said hopper may be filled, a cut-off valve between said bin and said hopper, a pair of flow-sensitive devices between said valve and said hopper, said devices being responsive to two different rates of material flow, and means operable by said scale to render said devices successively effective upon said valve to close the valve.

6. A device of the character described comprising a hopper, material supply means for said hopper including a control valve, a valve actuator, a shiftable control element between said valve and said hopper in the path of the material passing to said hopper so as to be actuated from its normal position by a predetermined flow of material, and means operatively connecting said element to said actuator completely to close the valve immediately when said element is so actuated and to effect opening of the valve when said element has returned to its normal position such closing being more rapid than the opening.

7. A weighing batcher having a weighing scale, a hopper operatively connected to said scale, a supply bin from which said hopper may be filled, a cut-off valve between said bin and said hopper, a pair of flow-sensitive devices sensitive to different rates of flow of material between said valve and said hopper, switches actuated by said devices, an electro-magnetically controlled valve actuator, a pair of conductors forming parallel circuits to said actuator, one of said switches being interposed in each of said conductors, and a second pair of switches connected one in each of said conductors, and means operable by said scale to open said second pair of switches successively in a given actuation of said scale.

8. A device of the character disclosed comprising a cut-off valve for controlling material flow, actuating means operable to effect gradual opening and rapid closing of said valve, i. e., the closing is rapid in comparison to the opening, and means sensitive to the rate of flow of the material operable to govern said actuating means.

9. In a device of the character described, the combination of a valve having a valve casing with a passage therethrough, a valve member in said casing for controlling said passage, a pair of shafts rotatably mounted in said casing below said valve member and on opposite sides of said passage, a pair of plates, said shafts each having one of said plates secured at one edge to the shaft, means urging said shafts to positions wherein said plates converge downwardly toward each other and across said passage, and means actuated by outward swinging movement of said plates to govern the position of said valve member.

10. In a device of the character described, the combination of a valve having a valve casing with a passage therethrough, a valve member in said casing for controlling said passage, a pair of pivoted elements in said casing below the valve and on opposite sides of said passage and offering different degrees of resistance to the flow of material, and means actuated by pivotal movement of said elements to govern the position of said valve member.

11. A device of the character described comprising a valve casing having a passage therethrough, a valve member in said casing controlling said passage, a pair of plates, means pivoting one of said plates adjacent one of its edges and on a horizontal axis adjacent one side of said passage, means similarly pivoting the other of said plates adjacent the opposite side of said passage, means urging said plates with different degrees of force to move the free edges thereof toward the center of said passage and into the path of the material moving therethrough, and means governed by the positions of said plates for controlling the operation of said valve.

12. A weighing batcher having, in combination, a scale hopper, a cut-off valve to control the flow of material to the scale hopper, a cylinder, a piston in the cylinder connected to the cut-off valve, means for constantly applying fluid pressure to the valve-closing side of the piston, a passage for supplying fluid pressure to the valve-opening side of the piston, a valve in said passage to supply fluid at higher pressure than that applied to the valve-closing side of the piston and to exhaust fluid from the valve-opening side of the piston, two feelers in the path of material flowing through the cut-off valve to the scale hopper, one of said feelers being more sensitive than the other, two electric switches each operated by one of said feelers, an electric circuit for operating said fluid pressure valve, said switches being included in parallel branches of said circuit, a scale beam operated by the scale hopper, a third switch included in one of said branches of the circuit, a fourth switch included in the other branch of said circuit, said third and fourth switches being operable by the scale beam, said third and fourth switches being arranged to be operated one ahead of the other as the beam approaches the poised position, the switch that is operated first being in the branch of the circuit containing the switch associated with the less sensitive feeler.

13. A weighing batcher having, in combination, a scale hopper, a cut-off valve to control the flow of material to the scale hopper, a cylinder, a piston in the cylinder connected to the cut-off valve, means for constantly applying fluid pressure to the valve-closing side of the piston, a passage for supplying fluid pressure to the valve-opening side of the piston, a valve in said passage to supply fluid at higher pressure than that applied to the valve-closing side of the piston and to exhaust fluid from the valve-opening side of the piston, two feelers in the path of material flowing through the cut-off valve to the scale hopper, one of said feelers being more sensitive than the other, an electric circuit for operating said fluid pressure valve, means operated by said feelers to control the flow of current in the circuit when both feelers yield to the stream of material, a scale beam operated by the scale hopper, and means operable by the scale beam as the beam reaches the poised position to control the flow of current in the circuit.

14. A weighing batcher having, in combination, a scale hopper, a cut-off valve to control the flow of material to the scale hopper, a cylinder, a piston in the cylinder connected to the cut-off valve, means for constantly applying fluid pressure to the valve-closing side of the piston, a passage for supplying fluid pressure to the valve-opening side of the piston, a valve in said passage to supply fluid at higher pressure than that applied to the valve-closing side of the piston and to exhaust fluid from the valve-opening side of the piston, two feelers in the path of material flowing through the cut-off valve to the scale hopper, one of said feelers being more sensitive than the other, two normally closed electric switches each operated by one of said feelers, and an electric circuit for operating said fluid pressure valve, said switches being included in the parallel branches of said circuit, a scale beam operated by the scale hopper, and means operated by the scale beam for breaking said circuit as the beam reaches the poised position.

15. A weighing batcher having, in combination, a scale hopper, a cut-off valve to control the flow of material to the scale hopper, a cylinder, a piston in the cylinder connected to the cut-off valve, means for constantly applying fluid pressure to the valve-closing side of the piston, a passage for supplying fluid pressure to the valve-opening side of the piston, a valve in said passage to supply fluid at higher pressure than that applied to the valve-closing side of the piston and to exhaust fluid from the valve-opening side of the piston, and two means to control said fluid pressure valve, one of said means being sensitive to the pressure of the stream of material, and the other being sensitive to the weight of the material in the hopper.

16. A weighing batcher having, in combination, a scale hopper, a cut-off valve to control the flow of material to the scale hopper, a cylinder, a piston in the cylinder connected to the cut-off valve, means for constantly applying fluid pressure to the valve-closing side of the piston, a passage for supplying fluid pressure to the valve-opening side of the piston, a valve in said passage to supply fluid at higher pressure than that applied to the valve-closing side of the piston and to exhaust fluid from the valve-opening side of the piston, two feelers in the path of material flowing through the cut-off valve to the scale hopper, one of said feelers being more sensitive than the other, an electric circuit for operating said fluid pressure valve, and means operated by said feelers to control the flow of current in the circuit when both feelers yield to the stream of material.

17. A weighing batcher having, in combination, a scale hopper, a cut-off valve to control the flow of material to the scale hopper, a cylinder, a piston in the cylinder connected to the cut-off valve, means for constantly applying fluid pressure to the valve-closing side of the piston, a passage for supplying fluid pressure to the valve-opening side of the piston, a valve in said passage to supply fluid at higher pressure than that applied to the valve-closing side of the piston and to exhaust fluid from the valve-opening side of the piston, two feelers in the path of material flowing through the cut-off valve to the scale hopper, one of said feelers being more sensitive than the other, two electric switches each operated by one of said feelers, and an electric circuit for operating said fluid pressure valve, said switches being included in parallel branches of said circuit.

18. A weighing batcher having, in combination, a scale hopper, a cut-off valve to control the flow of material to the scale hopper, a cylinder, a piston in the cylinder connected to the cut-off valve, to open the valve to various points and to close the valve from various points at a speed greater than the valve-opening speed, means for constantly applying fluid pressure to the valve-closing side of the piston, a passage for supplying fluid pressure to the valve-opening side of the piston, and a valve in said passage to supply fluid at higher pressure than that applied to the valve closing side of the piston and to exhaust fluid from the valve-opening side of the piston.

19. A weighing batcher having, in combination, a scale hopper, a cut-off valve to control the flow of material to the scale hopper, means to open and close said valve, means tending to operate the opening and closing means to effect closure of the valve, other means to operate the opening and closing means to effect opening of the valve, an electric circuit for energizing said other means, two feelers in the path of material flowing through the cut-off valve to the scale hopper, one of said feelers being more sensitive than the other, two electric switches each operated by one of said feelers, said switches being included in parallel branches of said circuit, a scale beam operated by the scale hopper, and means operated by the scale beam for breaking said circuit as the beam reaches the poised position.

20. A weighing batcher having, in combination, a scale hopper, a cut-off valve to control the flow of material to the scale hopper, means to open and close said valve, means tending to operate the opening and closing means to effect closure of the valve, other means to operate the opening and closing means to effect opening of the valve, an electric circuit for energizing said other means, two feelers in the path of material flowing through the cut-off valve to the scale hopper, one of said feelers being more sensitive than the other, and two electric switches each operated by one of said feelers, said switches being included in parallel branches of said circuit.

21. A weighing batcher having, in combination, a scale hopper, a cut-off valve to control the flow of material to the scale hopper, means to open and close said valve, an electric circuit controlling said means, two feelers in the path of material flowing through the cut-off valve to the scale hopper, one of said feelers being more sensitive than the other, two electric switches each operated by one of said feelers, said switches being included in parallel branches of said circuit, a scale beam operated by the scale hopper, and means operated by the scale beam for breaking said circuit as the beam reaches the poised position.

22. A weighing batcher having, in combination, a scale hopper, a cut-off valve to control the flow of material to the scale hopper, said valve tending to close completely, two feelers in the path of material flowing through the cut-off valve to the scale hopper, one of said feelers being more sensitive than the other, and means interposed between the feelers and the valve and arranged to allow the valve to close when both feelers yield to the pressure of the stream of material and to open the valve when the less sensitive feeler does not yield to the stream of material.

23. A weighing batcher having, in combination, a scale hopper to contain a weighed batch, a cut-off valve to control the flow of material to the hopper electrically controlled mechanism for opening and closing said valve, an electrical control circuit therefor, means sensitive to the pressure of the stream of material flowing into the hopper for opening and closing the control circuit of said mechanism, a shunt circuit around said means for rendering said means ineffective in said control circuit during the major portion of the weighing of the batch, means sensitive to the weight of material in the hopper for opening said shunt circuit to render said pressure-sensitive means effective during the final stages of weighing.

24. In a weighing batcher, the combination of a scale hopper to contain a weighed batch, a single cut-off valve to control the flow a material to the hopper, mechanism for operating said valve, an electrical circuit for controlling the operation of said mechanism and having two parallel branches, means sensitive to the weight of material in the hopper for opening one of said branches when the hopper contains a partial batch, means sensitive to the flow of material during the final stages for controlling the other of said branches, and means sensitive to the weight of material for opening said other branch when the weighing of a batch has been completed.

25. A weighing batcher having, in combination, a scale hopper to contain a weighed batch, a single cut-off valve to control the flow of material to the hopper, mechanism for closing said valve with a quick action and for opening said valve with a slow action, means sensitive to the pressure of the stream of material flowing into the hopper for controlling the operation of said mechanism, means for rendering said pressure-sensitive means ineffective during the first part of the weighing of the batch, and means sensitive to the weight of the material in the hopper for rendering the last-mentioned means ineffective during the final stages of filling.

26. A weighing batcher having, in combination, a scale hopper to contain a weighed batch, a cut-off valve to control the flow of material to the hopper, mechanism for operating said valve, means sensitive to the weight of material in the hopper for controlling said mechanism during the major portion of the weighing of the batch, means sensitive to the flow of material into the hopper for controlling the operation of said mechanism during the final stages of the weighing of the batch, and means sensitive to the weight of material in the hopper for causing said mechanism to close the valve when the weighing of the batch has been completed.

27. A weighing batcher having, in combination, a scale hopper to contain a weighed batch, a cut-off valve to control the flow of material to the hopper, mechanism for operating said valve, means sensitive to the flow of material to said hopper for controlling said mechanism during the final stages of the weighing of the batch, and means sensitive to the weight of material in the hopper for causing said mechanism to close the valve when the weighing of the batch has been completed.

28. A weighing batcher comprising, in combination, a scale hopper to contain a weighed batch, a cut-off valve to control the flow of material to the hopper, mechanism for operating said valve, means sensitive to the flow of material to said hopper for causing said mechanism to close when the flow exceeds a predetermined rate during the final stages of the weighing of the batch, and means sensitive to the weight of material in the hopper for causing said mechanism to close the valve when the weighing of the batch has been completed, said flow-sensitive means being positioned closely adjacent said cut-off valve whereby the falling material between said valve and said flow-sensitive means at the time of closure of said valve is reduced to a minimum to prevent overfilling of the hopper.

29. A weighing batcher comprising, in combination, a scale hopper to contain a weighed batch, a cut-off valve to control the flow of material to said hopper, mechanism for operating said valve, means sensitive to the weight of material in the hopper for causing said mechanism to close the valve when the weighing of the batch has been completed, and means to prevent the impact of the stream of material into the hopper from materially affecting the operation of said weight-sensitive means comprising a feeler positioned in the path of said stream of material and movable in accordance with the rate of flow thereof, and means connecting said feeler with said mechanism and arranged to cause said mechanism to close said valve when the flow exceeds a predetermined rate.

30. A weighing batcher having in combination, a scale hopper to contain a weighed batch, a cut-off valve to control the flow of material to the hopper, mechanism for opening and closing said valve, said mechanism being adapted to open and close the valve more than once during the weighing of the batch, means sensitive to the pressure of the stream of material issuing from the valve for controlling said mechanism during the final stages of the weighing of the batch, and means sensitive to the weight of the batch for causing said mechanism to close the valve when the hopper contains the desired weight of material.

31. In a weighing batcher, in combination, a batch hopper, weighing means connected therewith operable by the hopper to measure a predetermined quantity of materials in the hopper, a discharge for the hopper, a materials supply means, a valve between the supply means and the hopper to control passing of the materials to the hopper, mechanism operable by the hopper under the weight of materials supplied thereto, to cause final closing of the valve when the materials of the said predetermined quantity are received by the hopper, and instrumentalities affected by the flowing materials at the valve to intermittently move the valve toward closed and opened positions, before its final closing, to thereby control the speed of filling of the hopper.

32. In a weighing batcher, in combination, a batch hopper, weighing means connected therewith operable by the hopper to measure a predetermined quantity of materials in the hopper, a discharge for the hopper, a materials supply means, a valve between the supply means and the hopper to control passing of the materials to the hopper, mechanism operable by the hopper under the weight of materials supplied thereto, to cause final closing of the valve when the materials of the said predetermined quantity are received by the hopper, instrumentalities to move the valve with opening and closing action for feeding the materials to the hopper before final closing of the valve, and mechanism for causing rapidity of the closing movement and relative slowness of the opening movement.

33. In a weighing batcher, a batch hopper, hopper scales for weighing the hopper and materials received therein to be measured thereby, a discharge for the hopper, a supply source for materials to be fed to the hopper, a valve controlling flow of materials from the said source to the hopper, mechanism rendered operable by the hopper when a certain quantity of materials has been received therein to reduce the flow of the materials controlled by the valve, mechanism rendered operable by the hopper as an additional amount of materials is received therein to wholly discontinue flow of the materials to the hopper by closing the valve finally, and devices controlled by the amount of materials moving through said valve to the hopper to cause quick closing of the valve upon predetermined increase of the amount of flow, and slow opening of the valve to cut down said increased amount of flow, before the final closing of the valve.

34. In a weighing batcher, in combination, a weighing batch hopper, a materials supply source, a valve controlling the passage of materials from the source to the hopper, instrumentalities to act on the valve to cause it to intermittently open and close by varying degrees of movement to vary the amount of materials passing to the hopper during a filling cycle of action of the latter, and mechanism for finally closing the valve when the hopper is full of a predetermined amount of materials.

CHARLES S. JOHNSON.